(12) United States Patent
Lew et al.

(10) Patent No.: US 10,961,970 B1
(45) Date of Patent: Mar. 30, 2021

(54) METHODS AND SYSTEM FOR ENGINE STARTING

(71) Applicant: Ford Global Technologies, LLC, Dearborn, MI (US)

(72) Inventors: David Lew, Canton, MI (US); David Hancock, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/796,725

(22) Filed: Feb. 20, 2020

(30) Foreign Application Priority Data

Jan. 28, 2020 (DE) .......................... 102019201034.2

(51) Int. Cl.
| F02N 11/00 | (2006.01) |
| F02N 11/04 | (2006.01) |
| F02N 11/08 | (2006.01) |

(52) U.S. Cl.
CPC ............ F02N 11/006 (2013.01); F02N 11/04 (2013.01); F02N 11/0862 (2013.01); *F02N 2200/022* (2013.01); *F02N 2200/061* (2013.01); *F02N 2200/063* (2013.01)

(58) Field of Classification Search
CPC .................................................. F02N 11/006
See application file for complete search history.

(56) References Cited

U.S. PATENT DOCUMENTS

| 6,018,199 | A * | 1/2000 | Shiroyama ............. B60K 6/485 |
| | | | 290/37 A |
| 6,694,938 | B2 * | 2/2004 | Vilou ...................... F02N 11/00 |
| | | | 123/179.25 |
| 8,606,450 | B2 * | 12/2013 | Holmes .................... B60K 6/28 |
| | | | 701/22 |
| 9,422,906 | B2 * | 8/2016 | Kees ..................... B60W 20/16 |
| 9,677,527 | B2 * | 6/2017 | Kees ................... F02N 11/0862 |
| 9,828,924 | B1 * | 11/2017 | Connolly ........................... 11/6 |
| 9,956,951 | B2 * | 5/2018 | Kim ..................... B60W 30/194 |
| 10,029,695 | B1 * | 7/2018 | Gibson ................. B60W 10/08 |
| 10,202,956 | B2 * | 2/2019 | Klein ...................... F01B 27/02 |
| 10,253,743 | B2 * | 4/2019 | Choi ..................... B60W 10/06 |
| 10,288,028 | B2 * | 5/2019 | Nakaoka ............. F02N 11/0825 |
| 10,322,711 | B2 * | 6/2019 | Yamazaki ................ B60K 6/48 |
| 10,407,053 | B2 | 9/2019 | Ruybal et al. |
| 10,493,977 | B2 * | 12/2019 | Jang ........................ F02N 11/04 |
| 10,703,357 | B2 * | 7/2020 | Kim ........................ H02K 7/116 |
| 10,724,490 | B2 * | 7/2020 | Chen .................. B60W 30/194 |
| 10,794,353 | B2 * | 10/2020 | Kim ..................... F02N 11/0837 |
| 10,815,951 | B2 * | 10/2020 | Connolly .............. B60W 10/06 |
| 2003/0140879 | A1 * | 7/2003 | Vilou ...................... F02N 11/00 |
| | | | 123/179.3 |
| 2010/0031911 | A1 * | 2/2010 | Gessier ............... F02N 11/0866 |
| | | | 123/179.21 |
| 2013/0296126 | A1 * | 11/2013 | Gibson ................... B60L 50/40 |
| | | | 477/5 |

(Continued)

*Primary Examiner* — Kevin R Steckbauer
(74) *Attorney, Agent, or Firm* — Geoffrey Brumbaugh; McCoy Russell LLP

(57) ABSTRACT

Systems and methods for operating a powertrain or driveline that includes an engine and a belt integrated starter/generator are described. In one example, the belt integrated starter/generator is used to start an engine unless vehicle operating conditions indicate that the belt integrated starter/generator may be having difficulty starting the engine.

19 Claims, 5 Drawing Sheets

(56) References Cited

U.S. PATENT DOCUMENTS

| | | | |
|---|---|---|---|
| 2015/0224984 A1* | 8/2015 | Kees | B60W 20/16 |
| | | | 701/22 |
| 2015/0226171 A1* | 8/2015 | Kees | B60W 30/194 |
| | | | 290/31 |
| 2017/0254310 A1* | 9/2017 | Nakaoka | F02N 11/101 |
| 2018/0171961 A1* | 6/2018 | Choi | B60L 58/13 |
| 2018/0347534 A1* | 12/2018 | Lebreux | F02N 11/04 |
| 2019/0015398 A1 | 1/2019 | Osborne | |
| 2019/0153988 A1* | 5/2019 | Lebreux | F02D 41/064 |
| 2019/0153989 A1* | 5/2019 | Lebreux | F02N 11/0814 |
| 2019/0153990 A1* | 5/2019 | Lebreux | F02N 3/02 |
| 2019/0184971 A1* | 6/2019 | Kim | B60W 30/192 |
| 2019/0368458 A1* | 12/2019 | Chen | B60W 30/194 |
| 2019/0376482 A1* | 12/2019 | Kim | F02N 11/0825 |
| 2020/0056559 A1* | 2/2020 | Lebreux | F02P 5/1506 |

* cited by examiner

METHODS AND SYSTEM FOR ENGINE STARTING

FIELD

The present description relates to methods and a system for starting an engine of a vehicle that includes a belt integrated starter/generator. The methods and systems may be particularly useful for vehicles that include a starter and a belt driven integrated starter/generator.

BACKGROUND AND SUMMARY

A vehicle may include a starter that selectively engages an engine during engine starting. The vehicle may also include a belt integrated starter/generator (BISG) to charge a battery of a vehicle, provide propulsion power to the vehicle, and to start an engine of the vehicle. The BISG may rotate the engine during starting and it may rotate the engine while generating less noise, vibration, and harshness as compared to the starter. However, the starter may provide improved engine cranking while starting the engine at lower ambient temperatures as compared to the BISG because of belt slip. While it may be desirable to start the engine via the BISG each time the engine is started, it may be difficult to predict if the BISG may have sufficient torque capacity to start the engine each time the engine is requested to be started. Therefore, the starter may be used to start the engine more frequently than may be desired to ensure that the engine starts.

The inventors herein have recognized the above-mentioned issues and have developed an engine operating method, comprising: rotating an engine via a belt integrated starter/generator (BISG) in response to an engine start request; and engaging a starter to rotate the engine while the engine is rotated via the BISG, wherein the starter is engaged in response to a rate of change in battery voltage that is greater than a threshold rate of change.

By selectively engaging the starter while the BISG is rotating the engine, it may be possible to reliably start the engine when the BISG's capacity to start the engine may be lower than is desired. In addition, if the BISG's capacity to start the engine is determined to be higher, the starter may not be engaged so that engine starting noise and vibration may be reduced. Thus, the BISG may be used to start the engine, but if the torque capacity of the BISG is less than may be desired, then the starter may be engaged to start the engine. For example, if a battery has a reduced charge storing capacity or if vehicle operating conditions are conducive to BISG belt slip, the engine may be started via the starter. Since the torque capacity of the BISG is partially dependent on battery output, BISG torque capacity may be indicated by the rate of reduction in battery voltage when the engine is being cranked via the BISG. If the absolute value of the rate of battery voltage change is greater than a threshold rate of change, it may be an indication that the engine may not be started solely via the BISG or by simultaneously engaging the starter and rotating the engine via the BISG.

The present description may provide several advantages. In particular, the approach may improve the probability of engine starting when BISG torque capacity is low due to battery charge capacity being lower than may be desired. Further, the approach may reduce the possibility of further battery degradation that may be related to sourcing larger amounts of electric current. Further still, the approach may improve selection of devices to crank an engine during starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
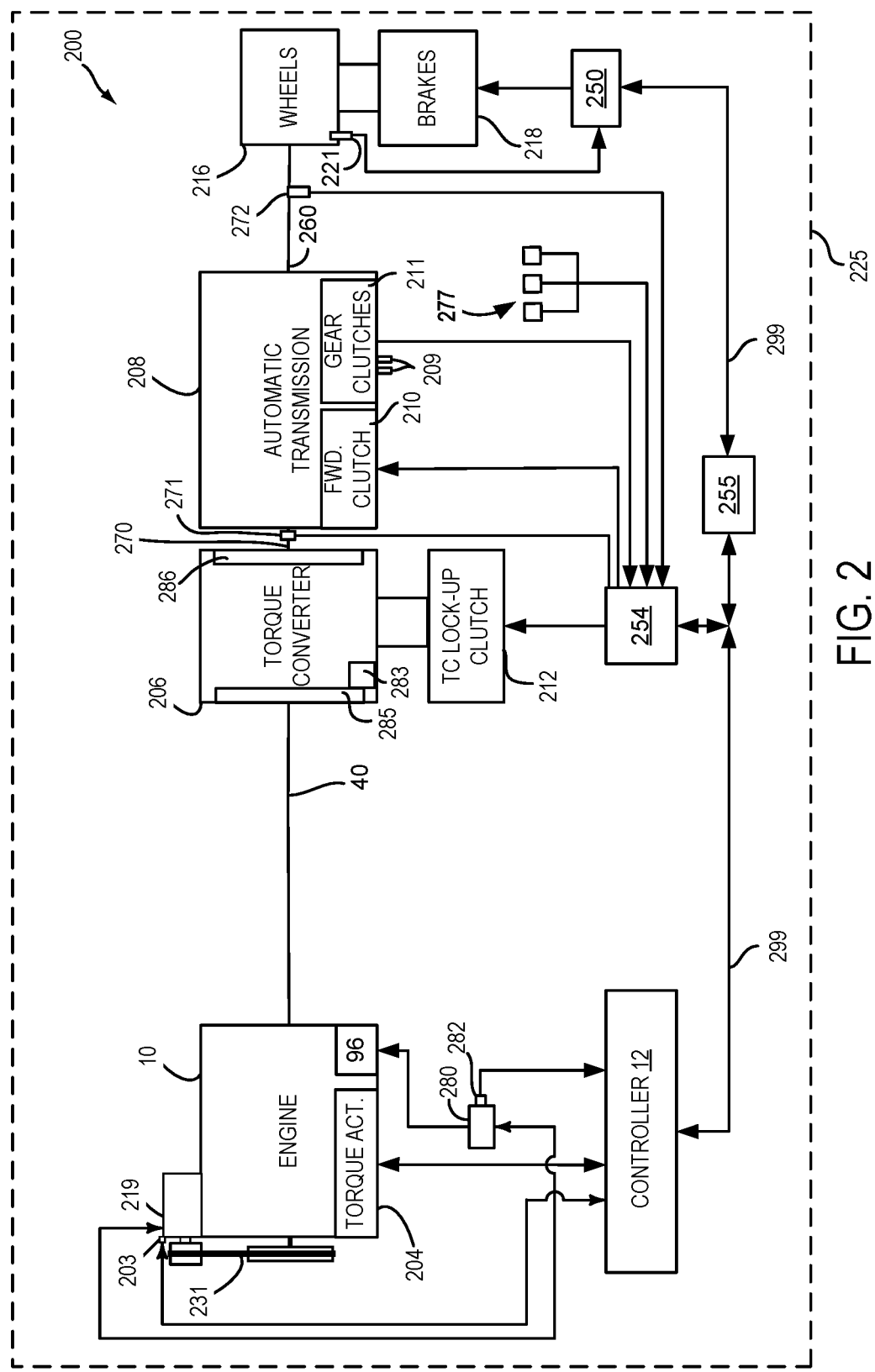
FIG. 2 is a schematic diagram of a vehicle driveline.
Figure 3:
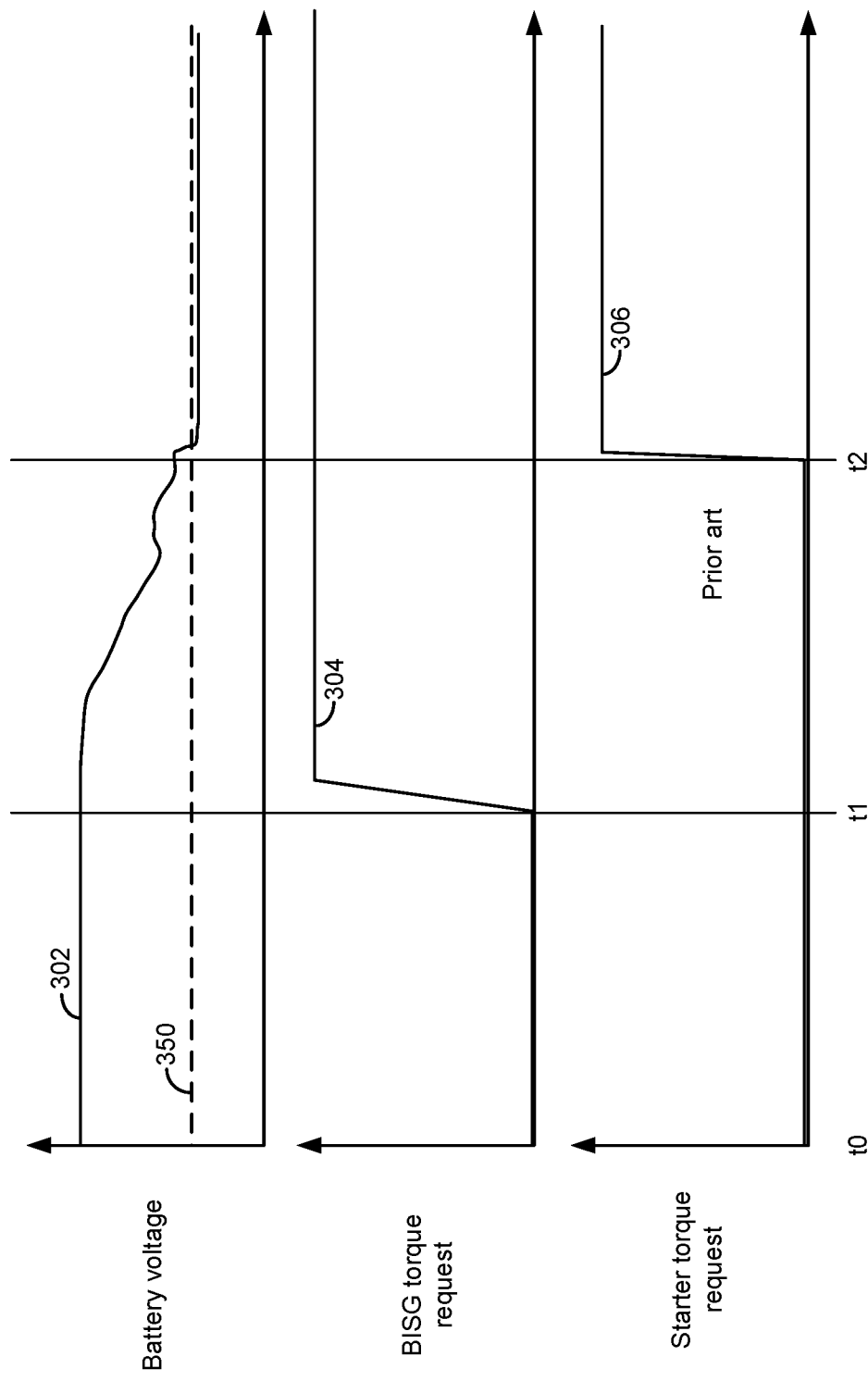
FIG. 3 is an example of a first engine starting sequence.
Figure 4:
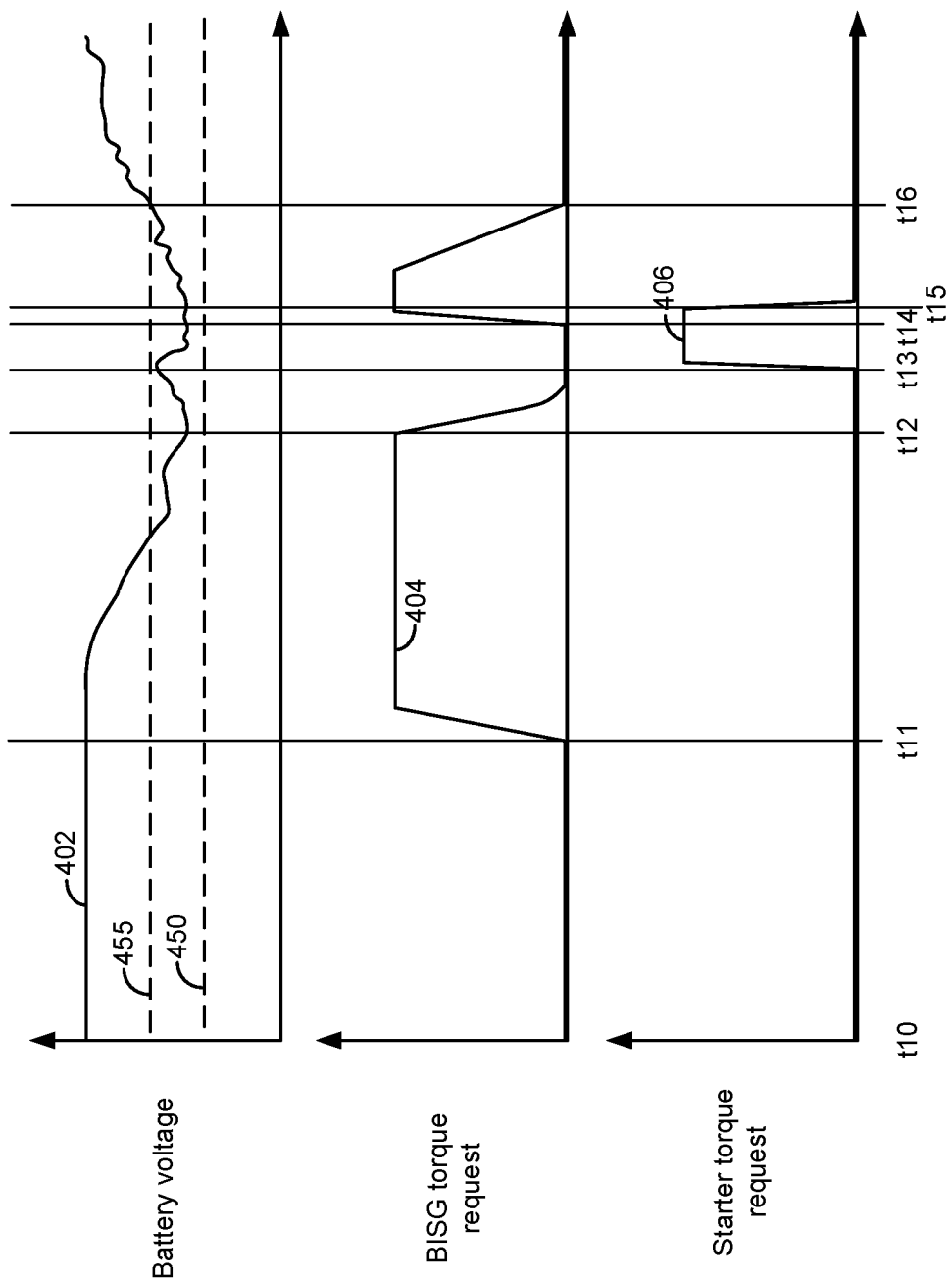
FIG. 4 is an example of a second engine starting sequence.

The present description is related to operating an engine that includes a starter and BISG. The engine may be started solely via the BISG when the BISG has torque capacity to start the engine. The engine may be started via the BISG and a starter when the BISG alone may find it difficult to start the engine; however, if the battery voltage indicates that the battery lacks capacity to start the engine via the BISG and the starter, then BISG torque may be reduced to increase priority of torque generated by the starter. The engine may be of the type shown in FIG. 1. The engine and the BISG may be included in a driveline of a vehicle as is shown in FIG. 2. Example engine starting sequences are shown in FIGS. 3 and 4. The engine may be started according to the method of FIG. 5.

Figure 1:
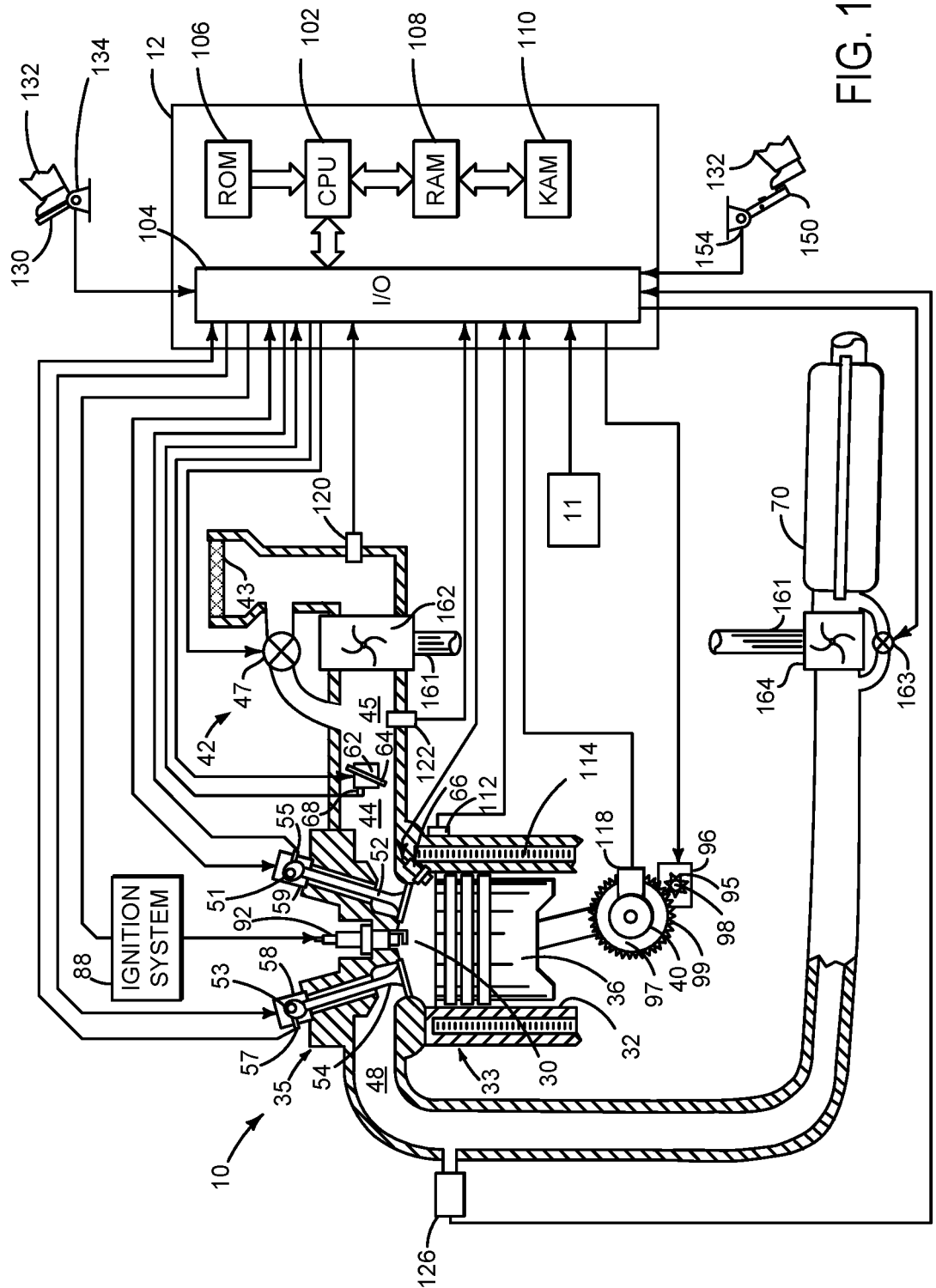
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99 and crankshaft 40. Ring gear 99 is directly coupled to crankshaft 40. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Engine 10 may be started with the engine starting system shown in FIG. 1 (e.g., starter 96) and/or via BISG 219. A speed of BISG 219 may be determined via optional BISG speed sensor 203. In addition, torque of engine 10 may be adjusted via torque actuator 204, such as a fuel injector, throttle, etc.

BISG 219 is mechanically coupled to engine 10 via belt 231. BISG may be coupled to crankshaft 40 or a camshaft (e.g., 51 or 53 of FIG. 1). BISG 219 may operate as a motor when supplied with electrical power via battery 280. BISG 219 may operate as a generator supplying electrical power to battery 280. Battery current may be monitored via current sensor 282 and battery voltage may be input to controller 12.

An engine output torque may be transmitted to torque converter impeller 285 via crankshaft 40. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In a similar way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the BISG 219. Vehicle system controller 255 requests the engine torque from engine controller 12. If the BISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge battery 280, a charging torque (e.g., a negative BISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the BISG 219 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. BISG 219 supplies a negative torque to transmission input shaft 270, but negative torque provided by BISG 219 may be limited by transmission controller 254 which outputs a transmission input shaft negative torque limit (e.g., not to be exceeded threshold value). Further, negative torque of BISG 219 may be limited (e.g., constrained to less than a threshold negative threshold torque) based on operating conditions of battery 280. Any portion of desired negative wheel torque that may not be provided by BISG 219 because of transmission or BISG limits may be allocated to friction brakes 218 so that the desired wheel torque is provided by a combination of negative wheel torque from friction brakes 218 and BISG 219.

Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative BISG torque does not cause the wheel torque limit to be exceeded. For example, if controller 250 issues a negative wheel torque limit of 10 N-m, BISG torque is adjusted to provide less than 10 N-m (e.g., 9 N-m) of negative torque at the wheels, including accounting for transmission gearing.

Thus, the system of FIGS. 1 and 2 provides for a system, comprising: an engine; a starter coupled to the engine; a belt integrated starter/generator (BISG) coupled to the engine via a belt; and a controller including executable instructions stored in non-transitory memory that cause the controller to engaging the starter to rotate the engine in response to an absolute value of a rate of change of battery voltage that is greater than a threshold rate of change. The system further comprises additional instructions to rotate the engine via the BISG in response to an engine start request. The system includes where the BISG rotates the engine before the starter is engaged. The system further comprises additional instructions to increase starter torque in response to the rate of change of the battery voltage being greater than the threshold rate of change. The system further comprises additional instructions to reduce BISG torque after the engine start request in response to the rate of change of the battery voltage being greater than the threshold rate of change. The system further comprises additional instructions to disengage the starter in response to engine speed.

Referring now to FIG. 3, an example engine starting sequence is shown. The starting sequence of FIG. 3 may be generated via the system of FIGS. 1 and 2. Vertical lines at times t0-t2 represent times of interest during the sequence. The plots in FIG. 2 are time aligned and occur at the same time.

The first plot from the top of FIG. 3 is a plot of battery voltage versus time. The vertical axis represents battery voltage and battery voltage increases in the direction of the vertical axis arrow. The battery voltage is zero at the level of the horizontal axis. The horizontal axis represents time and time increases from the left side of the plot to the right side of the plot. Trace 302 represents battery voltage. Horizontal line 350 represents a threshold voltage. It may not desirable for battery voltage to be lower than the level of line 350 because vehicle systems may not operate as desired when they are supplied with battery power at a voltage that is less than threshold 350.

The second plot from the top of FIG. 3 is a plot of requested BISG torque (e.g., an amount of torque that is requested to be generated via BISG 219 of FIG. 2) versus time. The vertical axis represents requested BISG torque and requested BISG torque increases in the direction of the vertical axis arrow. The requested BISG torque is zero at the level of the horizontal axis. The horizontal axis represents time and time increases from the left side of the plot to the right side of the plot. Trace 304 represents the requested BISG torque.

The third plot from the top of FIG. 3 is a plot of requested starter torque (e.g., an amount of torque that is requested to be generated via starter 96 of FIG. 1) versus time. The vertical axis represents requested starter torque and requested starter torque increases in the direction of the vertical axis arrow. The requested starter torque is zero at the level of the horizontal axis. The horizontal axis represents time and time increases from the left side of the plot to the right side of the plot. Trace 306 represents the requested starter torque.

At time t0, the engine (not shown) is not running (e.g., not rotating and not combusting fuel) and battery voltage (e.g., a voltage of battery 280) is at a higher level. The requested BISG torque is zero and the requested starter torque is zero. Such operating conditions may be present before an engine start request.

At time t1, an engine start is requested and the requested BISG torque is increased to 100% of the torque capacity of the BISG. For example, if the BISG has a maximum torque output of 60 newton-meters (Nm), then the requested BISG torque is increased to 60 Nm. The requested starter torque is zero Nm.

Between time t1 and time t2, the BISG applies torque to the engine and the engine rotates (not shown). The BISG consumes battery power and the battery voltage drops as electric power is supplied to the BISG from the battery. The BISG continues to apply torque to the engine and the torque supplied to rotate the engine is proportional to the electric current that is supplied to the BISG by the battery. The starter does not supply torque to rotate the engine and the battery does not supply electric power to the starter.

At time t2, the BISG continues to apply torque to the engine and the battery continues to supply electric power to the BISG. The battery voltage has been reduced down nearly to threshold 350. The torque is requested from the starter and the starter engages the engine and it begins to supply torque to the engine. Shortly after time t2, the battery voltage falls below threshold 350 as the starter supplies torque to rotate the engine. Engaging the starter and rotating the engine via the starter causes the starter to consume electric power from the battery and reduce battery voltage. The BISG and starter provide torque to engine and rotate the engine.

Referring now to FIG. 4, example plots of an engine starting sequence are shown. The operating sequence may be performed via the system of FIGS. 1 and 2 in cooperation with the method of FIG. 5. Vertical lines at times t10-t16 represent times of interest during the sequence. The plots in FIG. 4 are time aligned and occur at the same time.

The first plot from the top of FIG. 4 is a plot of battery voltage versus time. The vertical axis represents battery voltage and battery voltage increases in the direction of the vertical axis arrow. The battery voltage is zero at the level of the horizontal axis. The horizontal axis represents time and time increases from the left side of the plot to the right side of the plot. Trace 402 represents battery voltage. Horizontal line 450 represents a first threshold voltage. It may not desirable for battery voltage to be lower than the level of line 450 because vehicle systems may not operate as desired when they are supplied with battery power at a voltage that is less than threshold 450. Horizontal line 455 represents a second threshold voltage. The second threshold voltage may be a voltage that is a condition for activating the starter. In particular, the starter may not be activated without the battery voltage being less than the second threshold. For example, if battery voltage is less than second threshold voltage 455, then the starter may engage the engine and apply torque to the engine. If the battery voltage is not less than second threshold voltage 455, then the starter may not be engaged to the engine.

The second plot from the top of FIG. 4 is a plot of requested BISG torque (e.g., an amount of torque that is requested to be generated via BISG 219 of FIG. 2) versus time. The vertical axis represents requested BISG torque and requested BISG torque increases in the direction of the vertical axis arrow. The requested BISG torque is zero at the level of the horizontal axis. The horizontal axis represents time and time increases from the left side of the plot to the right side of the plot. Trace 404 represents the requested BISG torque.

The third plot from the top of FIG. 4 is a plot of requested starter torque (e.g., an amount of torque that is requested to be generated via starter 96 of FIG. 1) versus time. The vertical axis represents requested starter torque and requested starter torque increases in the direction of the vertical axis arrow. The requested starter torque is zero at the level of the horizontal axis. The horizontal axis represents time and time increases from the left side of the plot to the right side of the plot. Trace 406 represents the requested starter torque.

At time t10, the engine (not shown) is not running (e.g., not rotating and not combusting fuel) and battery voltage (e.g., a voltage of battery 280) is at a higher level. The requested BISG torque is zero and the requested starter torque is zero. Such operating conditions may be present before an engine start request.

At time t11, an engine start is requested and the requested BISG torque is increased to 100% of the torque capacity of the BISG. For example, if the BISG has a maximum torque output of 60 newton-meters (Nm), then the requested BISG torque is increased to 60 Nm. The requested starter torque is zero Nm.

Between time t11 and time t12, the BISG applies torque to the engine and the engine rotates (not shown). The BISG consumes battery power and the battery voltage drops as electric power is supplied to the BISG from the battery. The controller determines a rate of change of the battery voltage at predefined time intervals (e.g., every 100 milliseconds). In this example, the controller determines that the absolute value of the rate of change of battery voltage exceeds a threshold value (e.g., 3 volts per second). Further, the battery voltage falls to values less than threshold 455. The BISG continues to apply torque to the engine and the torque supplied to rotate the engine is proportional to the electric current that is supplied to the BISG by the battery. The starter does not supply torque to rotate the engine and the battery does not supply electric power to the starter.

At time t12, the requested BISG torque is reduced in response to the rate of battery voltage change exceeding a threshold level and battery voltage being below threshold 455. By reducing the requested BISG torque, the amount of power that is consumed via the BISG may be reduced along with the amount of electric current that is consumed via the BISG. The reduction in electric power consumption by the BISG allows the battery voltage to increase back toward its nominal level. The engine may be rotating via torque that is supplied via the BISG; however, the engine may be rotating at a speed that may be less than is desired. The starter is not engaged and it is not supplying torque to the engine.

At time t13, the battery voltage has increased as compared to its minimum voltage between time t11 and time t12. The requested BISG torque has been reduced to zero in this example, but in other examples it may be non-zero when the starter is engaged. The starter is engaged while the engine is rotating (not shown) and the starter applies torque so that the engine may continue to rotate. Shortly after time t13, the battery voltage falls in response to engaging the starter, but it is not reduced to a level that is less than threshold 450. Thus, it may be possible to rotate the engine without degrading electric components due to low battery voltage.

At time t14, the starter remains engaged with the engine and it supplies torque to the engine. In addition, the requested BISG torque is increased to further accelerate the engine. However, engine speed increases and engine friction is overcome so that battery voltage does not fall below threshold 450 even though both the starter and the BISG are delivering torque to the engine.

At time t15, the requested starter torque is reduced as the engine begins to accelerate (not shown) and combustion is initiated in the engine (not shown). The BISG continues to deliver torque to assist the engine accelerating to a desired speed (e.g., engine idle speed). The battery voltage begins to increase after the requested starter torque is reduced because the starter consumes less electric energy from the battery.

At time t16, the engine has accelerated to a threshold speed (e.g., engine idle speed) (not shown) so the requested BISG torque is reduced to zero. The starter is not supplying torque to the engine and the battery voltage increases in response to the decrease in requested BISG torque. In this way, an engine may be started via a BISG and a starter without battery voltage falling below a threshold voltage. In addition, the requested starter torque may be increased in response to a rate of battery voltage change so that the engine may be started if the BISG is consuming power from a battery and not starting an engine as may be desired.

Figure 5:
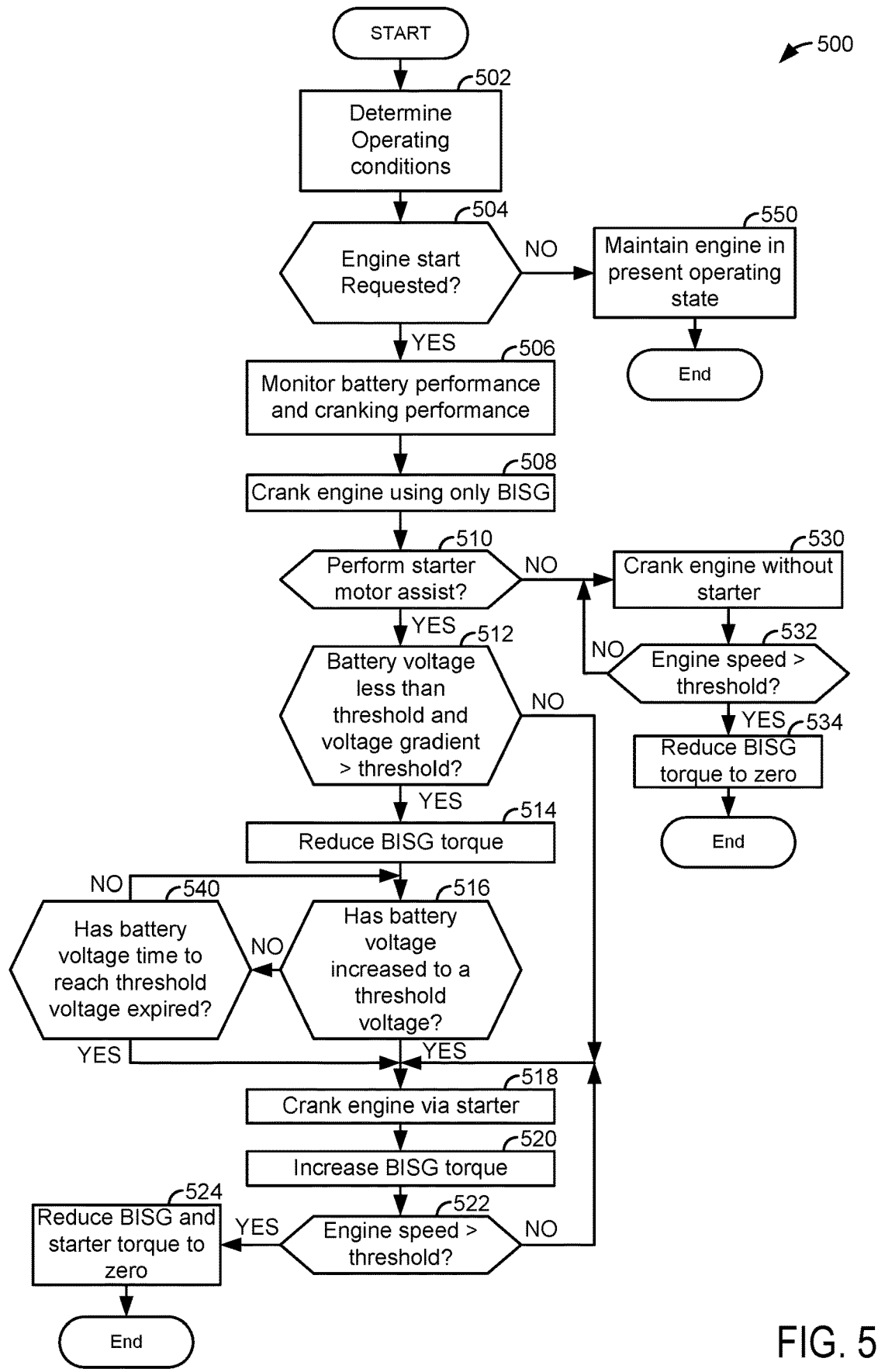
FIG. 5 shows a method for starting an engine that includes a BISG.

Referring now to FIG. 5, a flow chart of a method for starting an engine is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world.

At 502, method 500 determines operation conditions. Operating conditions may include but are not limited to ambient temperature, engine temperature, engine speed, BISG torque output, BISG speed, battery voltage, and battery output power. Method 500 proceeds to 504.

At 504, method 500 judges if an engine start is requested. An engine start may be requested via a human providing input to a controller, via a controller, or via a signal from a remote device (e.g., key fob). If method 500 determines that there is an engine start request, the answer is yes and method 500 proceeds to 506. Otherwise, the answer is no and method 500 proceeds to 550.

At 550, method 500 maintains engine operation in its present state. For example, if the engine is running (e.g., rotating and combusting fuel), the engine continues to run. If the engine is stopped, the engine remains stopped. Method 500 proceeds to exit.

At 506, method 500 monitors battery and engine cranking performance. The battery voltage and current may be monitored via the controller. The engine cranking performance may be monitored via monitoring engine speed. A low engine speed may indicate poor engine cranking performance and a higher engine speed may indicate good engine cranking performance. Method 500 may also determine a rate of battery voltage change via the following equation;

$$\Delta batt = \frac{vbatt_2 - vbatt_1}{t_2 - t_1}$$

where $\Delta batt$ is the change in battery voltage over time (e.g., $$\frac{\Delta Vbatt}{\Delta t};$$

change in battery voltage per change in time t), $vbatt_2$ is battery voltage at time $t_2$, $vbatt_1$ is battery voltage at time $t_1$. $t_2$ is time $t_2$, and $t_1$ is time $t_1$. The change in battery voltage may be monitored the entire time that the BISG supplies torque to the engine. Method 500 proceeds to 508.

At 508, method requests that the BISG supply a torque to crank (e.g., rotate) the engine so that the engine may be started. In one example, method 500 requests that the BISG provides 100% of its torque capacity to crank the engine. For example, if the BISG may generate at most 60 Nm of torque while receiving electric power from a fully charged battery that retains 85% or more of its rated output capacity, then method 500 requests that the BISG provide 60 Nm of torque to rotate the engine. The starter is not engaged and not supplying torque to the engine. The engine may begin rotating in response to the BISG supplying torque to rotate the engine. Method 500 proceeds to 510.

At 510, method 500 judges whether or not to engage and activate the starter to start the engine, thereby assisting the BISG to start the engine. In one example, method 500 may assess vehicle operating conditions to determine if the BISG is to be assisted by the starter to start the engine. For example, method 500 may judge that the starter will assist the BISG to start the engine when engine temperatures are less than 5° C. In addition, method 500 may judge that the starter will assist the BISG to start the engine when greater than a threshold amount of belt slip is detected. Belt slip may be determined by the following equation: Slip=(BISG speed*PR)−engine speed, where slip is BISG belt slip, BISG speed is the rotational speed of the BISG, and PR is the pulley ratio between the BISG and the engine. In addition, method 500 may judge that the starter will assist the BISG to start the engine in response to other vehicle conditions. If method 500 judges that the starter is to be activated to assist the BISG starting the engine, the answer is yes and method 500 proceeds to 512. Otherwise, the answer is no and method 500 proceeds to 530.

If the answer at 512 is no, then the BISG and starter supply torque to the engine without reducing BISG torque since the battery voltage indicates that the battery has sufficient capacity to power the BISG and the starter.

At 530, method 500 continues cranking the engine solely via the BISG. The engine starter is not activated, nor does it engage the engine. Method 500 proceeds to 532.

At 532, method 500 judges if engine speed is greater than a threshold speed (e.g., 400 RPM). If so, the answer is yes and method 500 proceeds to 534. Otherwise, the answer is no and method 500 returns to 530. In addition, method 500 may proceed to 534 if the BISG has been cranking the engine for longer than a threshold amount of time.

At 534, method 500 reduces BISG output torque to zero. Method 500 proceeds to exit.

At 512, method 500 judges if the absolute value of a change in battery voltage is greater than a threshold amount. For example, method 500 may judge if |battery voltage|>3 volts per second while the BISG is rotating the engine. If so, the answer is yes and method 500 proceeds to 514. In other examples, method 500 may judge if the absolute value of the change in battery voltage is greater than a threshold amount and if battery voltage is less than a threshold voltage. If so, the answer is yes and method 500 proceeds to 514. Otherwise, the answer is no and method 500 proceeds to 518. A change in battery voltage that is greater than a threshold amount may be indicative of battery degradation (e.g., loss of charge storage capacity). Engaging the starter and reducing BISG torque when battery degradation is present may allow the engine to be started since the starter may rotate the engine without the possibility of belt slippage and its associated losses.

At 514, method 500 reduces the BISG torque output. In one example, the BISG torque output may be reduced as a function of the rate of change of battery voltage determined at 512.

For example, if the battery voltage change is large, the requested BISG torque output may be reduced by a larger amount. If the battery voltage change is small, the requested BISG torque output may be reduced a smaller amount. Method 500 proceeds to 516.

At 516, method 500 judges if the battery voltage has increased by a threshold voltage. For example, method 500 may judge if the battery voltage has increased by 1 volt since the BISG torque output was most recently reduced. If method 500 judges that the battery voltage has increased by the threshold amount, the answer is yes and method 500 proceeds to 518. Otherwise, the answer is no and method 500 proceed to 540.

At 540, method 500 judges if an amount of time for the battery voltage to recover to the threshold voltage has expired. For example, if the threshold amount of time is 2 seconds, method 500 may judge that the battery voltage has not increased by 1 volt two seconds after the BISG torque output has been reduced. If method 500 judges that an amount of time for the battery voltage to recover to the threshold voltage has expired, the answer is yes and method 500 proceeds to 518. Otherwise, the answer is no and method 500 returns to 516.

At 518, method 500 engages the starter to the engine and cranks the engine via the starter. The starter may be engaged to the engine via advancing a pinion shaft and the requested torque output of the starter may be increased to the torque output capacity of the starter. Method 500 proceeds to 520.

At 520, method 500 increases torque output of the BISG to accelerate the engine. The torque output of the BISG may be increased a threshold amount of time since a most recent time that the starter engaged the engine and supplied torque to rotate the engine. Alternatively, the BISG torque may be increased in response to engine speed being greater than a threshold speed (e.g., 250 RPM). In some examples, the requested starter torque may be reduced in response to increasing the requested BISG torque or in response to engine speed exceeding a threshold speed. Method 500 proceeds to 522.

At 522, method 500 judges if engine speed is greater than a threshold speed (e.g., 400 RPM). If so, the answer is yes and method 500 proceeds to 524. Otherwise, the answer is no and method 500 returns to 518. In addition, method 500 may proceed to 524 if the BISG and/or starter have been cranking the engine for longer than a threshold amount of time.

At 524, method 500 reduces BISG output torque to zero. In addition, method 500 may reduce starter torque output to zero if it has not already been reduced. Method 500 proceeds to exit.

In this way, the engine may be started solely via BISG or via the BISG and the starter. The BISG may be given priority to start the engine so that engine cranking noise may be reduced. If battery voltage indicates that the BISG may be having difficulty starting the engine, then the engine may be cranked via the starter.

Thus, the method of FIG. 5 provides for an engine operating method, comprising: rotating an engine via a belt integrated starter/generator (BISG) in response to an engine start request; and engaging a starter to rotate the engine while the engine is rotated via the BISG, wherein the starter is engaged in response to a rate of change of battery voltage that is greater than a threshold rate of change. The method further comprises engaging the starter in response to the rate of change of battery voltage not being greater than the threshold rate of change without reducing BISG output torque. The method further comprises not engaging the starter to rotate the engine in response to starter assist not being requested. The method further comprises requesting an increase in starter torque output in response to the rate of change in battery voltage being greater than the threshold rate of change.

In some examples, the method further comprises reducing BISG torque output in response to the rate of change in battery voltage being greater than the threshold rate of change. The method further comprises increasing BISG torque output in response to engine speed after reducing BISG torque. The method further comprises determining the rate of change of battery voltage via a controller. The method further comprises disengaging the starter in response to engine speed. The method of FIG. 5 also provides for an engine operating method, comprising: rotating an engine via a belt integrated starter/generator (BISG) in response to an engine start request; and engaging a starter to rotate the engine while the engine is rotated via the BISG, wherein the starter is engaged in response to a rate of change in battery voltage that is greater than a threshold rate of change and a battery voltage being less than a threshold voltage. The method includes wherein the starter is further engaged in further response to a battery voltage being less than a threshold voltage. The method further comprises not engaging the starter to rotate the engine in response to starter assist not being requested. The method further comprises requesting an increase in starter torque output in response to the rate of change in battery voltage being greater than the threshold rate of change. The method further comprises determining the rate of change of battery voltage via a controller. The method further comprises disengaging the starter in response to engine speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   rotating an engine via a belt integrated starter/generator (BISG) in response to an engine start request; and
   engaging a starter to rotate the engine while the engine is rotated via the BISG, wherein the starter is engaged in response to determining that a rate of change of battery voltage is greater than a threshold rate of change.

2. The method of claim 1, further comprising engaging the starter in response to the rate of change of battery voltage not being greater than the threshold rate of change without reducing BISG output torque.

3. The method of claim 1, further comprising not engaging the starter to rotate the engine in response to starter assist not being requested.

4. The method of claim 1, further comprising requesting an increase in starter torque output in response to the rate of change in battery voltage being greater than the threshold rate of change.

5. The method of claim 1, further comprising reducing BISG torque output in response to the rate of change in battery voltage being greater than the threshold rate of change.

6. The method of claim 5, further comprising increasing BISG torque output in response to engine speed after reducing BISG torque.

7. The method of claim 1, further comprising determining the rate of change of battery voltage via a controller.

8. The method of claim 1, further comprising disengaging the starter in response to engine speed.

9. A system, comprising:
    an engine;
    a starter coupled to the engine;
    a belt integrated starter/generator (BISG) coupled to the engine via a belt; and
    a controller including executable instructions stored in non-transitory memory that cause the controller to engage the starter to rotate the engine in response to determining that a rate of change of battery voltage is greater than a threshold rate of change.

10. The system of claim 9, further comprising additional instructions to rotate the engine via the BISG in response to an engine start request.

11. The system of claim 10, where the BISG rotates the engine before the starter is engaged.

12. The system of claim 11, further comprising additional instructions to increase starter torque in response to the rate of change of the battery voltage being greater than the threshold rate of change.

13. The system of claim 12, further comprising additional instructions to reduce BISG torque after the engine start request in response to the rate of change of the battery voltage being greater than the threshold rate of change.

14. The system of claim 13, further comprising additional instructions to disengage the starter in response to engine speed.

15. An engine operating method, comprising:
    rotating an engine via a belt integrated starter/generator (BISG) in response to an engine start request; and
    engaging a starter to rotate the engine while the engine is rotated via the BISG, wherein the starter is engaged in response to determining that a rate of change in battery voltage is greater than a threshold rate of change and a battery voltage is less than a threshold voltage.

16. The method of claim 15, further comprising not engaging the starter to rotate the engine in response to starter assist not being requested.

17. The method of claim 15, further comprising requesting an increase in starter torque output in response to the rate of change in battery voltage being greater than the threshold rate of change.

18. The method of claim 15, further comprising determining the rate of change of battery voltage via a controller.

19. The method of claim 15, further comprising disengaging the starter in response to engine speed.

* * * * *